(12) United States Patent
Matsumoto (10) Patent No.: US 7,664,525 B2
(45) Date of Patent: Feb. 16, 2010

(54) COMMUNICATION SYSTEM, COMMUNICATION CONTROLLER AND COMMUNICATION CONTROL METHOD

(75) Inventor: Tatsuki Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 722 days.

(21) Appl. No.: 11/058,365

(22) Filed: Feb. 16, 2005

(65) Prior Publication Data
US 2005/0195779 A1 Sep. 8, 2005

(30) Foreign Application Priority Data
Mar. 3, 2004 (JP) ............................. 2004-058310

(51) Int. Cl.
*H04M 1/00* (2006.01)
(52) U.S. Cl. ................. 455/552.1; 455/41.2; 455/3.06; 455/556.1; 455/414.1; 370/338; 709/204; 709/227
(58) Field of Classification Search ................. 370/338, 370/465; 455/426.1, 552.1, 517–519, 41.2, 455/3.06; 725/62, 110; 348/14.02
See application file for complete search history.

(56) References Cited

U.S. PATENT DOCUMENTS

| | | | | |
|---|---|---|---|---|
| 5,666,661 | A * | 9/1997 | Grube et al. ................. 455/509 |
| 5,995,500 | A * | 11/1999 | Ma et al. .................... 370/337 |
| 6,167,285 | A * | 12/2000 | Howe ....................... 455/552.1 |
| 6,459,688 | B1 * | 10/2002 | Bursztejn et al. ............ 370/329 |
| 6,459,906 | B1 * | 10/2002 | Yang ........................ 455/556.1 |
| 6,532,004 | B1 * | 3/2003 | Harrison et al. ............. 345/169 |
| 6,577,849 | B1 * | 6/2003 | Eaton et al. ................ 455/3.01 |
| 6,975,881 | B2 * | 12/2005 | Sheynman et al. ....... 455/552.1 |
| 6,983,162 | B2 * | 1/2006 | Garani et al. ............... 455/518 |
| 7,139,827 | B1 * | 11/2006 | Iwayama et al. ............ 709/227 |
| 7,149,475 | B2 * | 12/2006 | Kawamura .................. 455/41.2 |
| 7,319,886 | B2 * | 1/2008 | Tokoro ...................... 455/552.1 |
| 7,376,441 | B2 * | 5/2008 | Lee .......................... 455/556.1 |
| 7,409,205 | B2 * | 8/2008 | Mittal ....................... 455/414.1 |
| 2002/0052183 | A1 * | 5/2002 | Tokoro ......................... 455/41 |
| 2003/0186722 | A1 | 10/2003 | Weiner |
| 2004/0055011 | A1 * | 3/2004 | Bae et al. ....................... 725/62 |
| 2004/0077352 | A1 * | 4/2004 | Mahany ...................... 455/448 |
| 2007/0060054 | A1 * | 3/2007 | Romesburg ................ 455/41.2 |
| 2008/0120668 | A1 * | 5/2008 | Yau ........................... 725/110 |

(Continued)

FOREIGN PATENT DOCUMENTS

EP 1128691 A2 8/2001

(Continued)

*Primary Examiner*—Sharad Rampuria
(74) *Attorney, Agent, or Firm*—Sughrue Mion, PLLC (57) ABSTRACT

A communication controller for a communication system associated with a plurality of communication modes is connected to a database storing the communication mode associated state of each terminal, and the communication controller recognizes the communication mode associated states of a connection source and a connection destination by referring to the database, and if multiple communication modes are common to both terminals, notifies the multiple communication modes common to both terminals to the portable telephone terminal of connection source, before connecting to the portable telephone terminal of connection destination, upon receiving a connection request from the connection source to the connection destination. Even if the user of a connection source terminal does not recognize or register in advance the communication mode associated state of a connection destination terminal, the terminals can be connected in a desired communication mode without causing any wasteful traffic.

11 Claims, 6 Drawing Sheets

U.S. PATENT DOCUMENTS

2008/0261649 A1 * 10/2008 Mukai et al. ............ 455/552.1

FOREIGN PATENT DOCUMENTS

| | | |
|---|---|---|
| EP | 1317157 A2 | 6/2003 |
| EP | 1376989 A2 | 1/2004 |
| EP | 1381185 A1 | 1/2004 |
| JP | 6-334742 A | 12/1994 |
| JP | 10-155007 A | 6/1998 |
| JP | 2000-049901 A | 2/2000 |
| JP | 2001-249878 A | 9/2001 |
| JP | 2003-398744 A | 10/2003 |
| JP | 2003-338879 A | 11/2003 |

* cited by examiner

FIG. 7

COMMUNICATION SYSTEM, COMMUNICATION CONTROLLER AND COMMUNICATION CONTROL METHOD

BACKGROUND OF THE INVENTION

1. Field of the Invention

The present invention relates to a communication system, a communication controller and a communication control method associated with a plurality of communication modes, and more particularly to a communication system, a communication controller and a communication control method for portable telephones associated with a voice service mode and a television telephone mode.

2. Description of the Prior Art

A communication system associated with a plurality of communication modes is well known. For example, a portable telephone communication system of the third generation is associated with a voice service mode using a voice channel, a television telephone mode using the voice channel and a video channel, and a data communication mode using a data channel, and further a television conference mode using the voice channel and the video channel to enable three or more terminals to be connected at the same time. In the future, it is expected that the communication modes are diversified because the kind of channel, the number of use channels, and connection forms are increased.

By the way, if the communication modes are diversified, it is necessary to take into consideration a difference in the communication mode associated state between terminals. For example, the methods have been offered in which when a portable telephone terminal having a television telephone function calls a portable telephone terminal without television telephone function in the television telephone mode, a switching center automatically switches to the voice service mode, and the originating portable telephone set automatically recalls in the voice service mode upon a communication disconnect of the called portable telephone terminal.

However, with the above methods, since the called portable telephone terminal is once connected and the communication mode is switched in response thereto, there is a problem that a wasteful traffic occurs. Also, according to the above methods, even though both terminals can deal with the television telephone mode, when the originating portable telephone terminal calls in the voice service mode, the called portable telephone terminal is directly connected in the voice service mode, resulting in a problem that the opportunity of using the television telephone function is reduced.

Thus, a communication controller that optimizes the connection in accordance with connection destination information registered by the user of connection source has been offered (e.g., refer to Japanese Unexamined Patent Publication No. 2003-298744). If such communication controller is employed, there is less connection error between terminals caused by a difference in the communication mode, making it possible to suppress wasteful traffic.

BRIEF SUMMARY OF THE INVENTION

However, in the above patent document, since it is required that the user of connection source recognizes in advance the communication mode associated state of connection destination, and registers its information in the communication controller, there is a problem that the user has a great load, and the connection is not optimized for the connection destination for which the communication mode associated state is unrecognized.

Also, when the communication system is applied for the portable telephone terminal with high frequency of changing the device type, there is possibility that the old information of connection destination is held, though the device type of the connection destination is changed, bringing about a possibility that a connection error between terminals occurs.

It is an object of the invention to provide a communication system, a communication controller and a communication control method in which even if the user of the connection source terminal does not recognize or register in advance the communication mode associated state of the connection destination terminal, the terminals can be connected in a desired communication mode without causing any wasteful traffic.

In order to achieve the above object, the present invention provides a communication system associated with a plurality of communication modes, comprising a plurality of terminals associated with one or more communication modes, a database storing a communication mode associated state of each terminal, and a communication controller for recognizing the communication mode associated states of a connection source terminal and a connection destination terminal by referring to the database, and if multiple communication modes are common to both terminals, notifying the multiple communication modes common to both terminals to the connection source terminal, before connecting to the connection destination terminal, upon receiving a connection request from the connection source terminal to the connection destination terminal.

With this configuration, the connection source terminal is notified of the multiple communication modes common to both terminals, before connecting to the connection destination terminal, whereby the terminals can be connected in a desired communication mode without causing any wasteful traffic.

Also, since it is unnecessary that the user of connection source terminal recognizes or registers in advance the communication mode associated state of the connection destination terminal, the user is saved from trouble.

Also, the invention provides the communication system, wherein the connection source terminal prompts the user to select a communication mode, and notifies the communication mode selected by the user to the communication controller, upon receiving a notification of communication modes from the communication controller.

With this configuration, the user of connection source terminal confirms the selectable communication modes on the connection source terminal and performs a predetermined selection operation, whereby the connection source terminal can be connected to the connection destination terminal in a desired communication mode.

Also, the invention provides the communication system, wherein the connection source terminal and/or the connection destination terminal registers in advance whether or not connection is enabled in a predetermined communication mode in the database, and the communication controller recognizes a communication mode not permitted by the connection source terminal and/or the connection destination terminal by referring to the database, and restricts the connection in the communication mode, upon receiving a connection request from the connection source terminal to the connection destination terminal.

With this configuration, it is possible to restrict the connection in the predetermined communication mode at the former stage of connecting to the connection destination terminal, whereby there is less wasteful traffic in mode restriction than at the terminal settings. Also, since the restricted communication mode is registered for each origination or termination, the degree of freedom of settings regarding the mode restriction is increased.

Also, the invention provides the communication system, wherein the connection destination terminal registers a connection permissible terminal in a predetermined communication mode in the database, and the communication controller recognizes whether or not the connection source terminal is the connection permissible terminal for the connection destination terminal by referring to the database, and permits the connection in the communication mode, only if the connection source terminal is the connection permissible terminal, upon receiving a connection request from the connection source terminal to the connection destination terminal.

With this configuration, when the terminal other than the connection permissible terminal requests connection in a predetermined communication mode, the connection is restricted at the former stage of connecting to the connection destination terminal, whereby there is less wasteful traffic in connection restriction than at the terminal settings.

Also, the invention provides the communication system, wherein the terminal is a portable telephone terminal, and the database and the communication controller are provided in a core network of a portable telephone communication network.

With this configuration, the invention is applied in the portable telephone communication system to optimize the connection. Also, since the database storing the position information of the portable telephone terminal is provided in the core network of the portable telephone communication network, there is an advantage that it is also employed as the database of the invention.

Also, the invention provides the communication system, wherein the terminal automatically notifies the terminal identification information and/or portable telephone number and the communication mode associated state to the core network.

With this configuration, it is possible to accumulate the communication mode associated state of each terminal in the database, and easily handle a change in the communication mode associated state due to the changed device type of the terminal, without the user performing the registration operation.

Since the portable telephone terminal has a function of automatically transmitting a position registration signal when the power is turned on, or the terminal moves across the area, it is possible to easily implement the automatic notification of the communication mode associated state, employing this function.

Also, the invention provides the communication system, wherein the communication modes include at least a voice service mode and a television telephone mode.

With this configuration, the invention is applied to the communication system associated with the voice service mode and the television telephone mode to optimize the connection.

Also, in order to achieve the above object, the invention provides a communication controller for controlling the communication between a plurality of terminals associated with one or more communication modes, wherein the communication controller is connected to a database storing a communication mode associated state of each terminal, and the communication controller recognizes the communication mode associated states of a connection source terminal and a connection destination terminal by referring to the database, and if multiple communication modes are common to both terminals, notifies the multiple communication modes common to both terminals to the connection source terminal, before connecting to the connection destination terminal, upon receiving a connection request from the connection source terminal to the connection destination terminal.

In this way, the invention is practiced as the communication controller and provides the same effects as the communication system.

Also, in order to achieve the above object, the invention provides a communication control method for controlling the communication between a plurality of terminals associated with one or more communication modes, wherein a database stores a communication mode associated state of each terminal, and a communication controller recognizes the communication mode associated states of a connection source terminal and a connection destination terminal by referring to the database, and if multiple communication modes are common to both terminals, notifies the multiple communication modes common to both terminals to the connection source terminal, before connecting to the connection destination terminal, upon receiving a connection request from the connection source terminal to the connection destination terminal.

In this way, the invention is practiced as the communication control method and provides the same effects as the communication system.

DETAILED DESCRIPTION OF THE PREFERRED EMBODIMENTS

The preferred embodiments of the invention will be described below with reference to the accompanying drawings.

Figure 1:
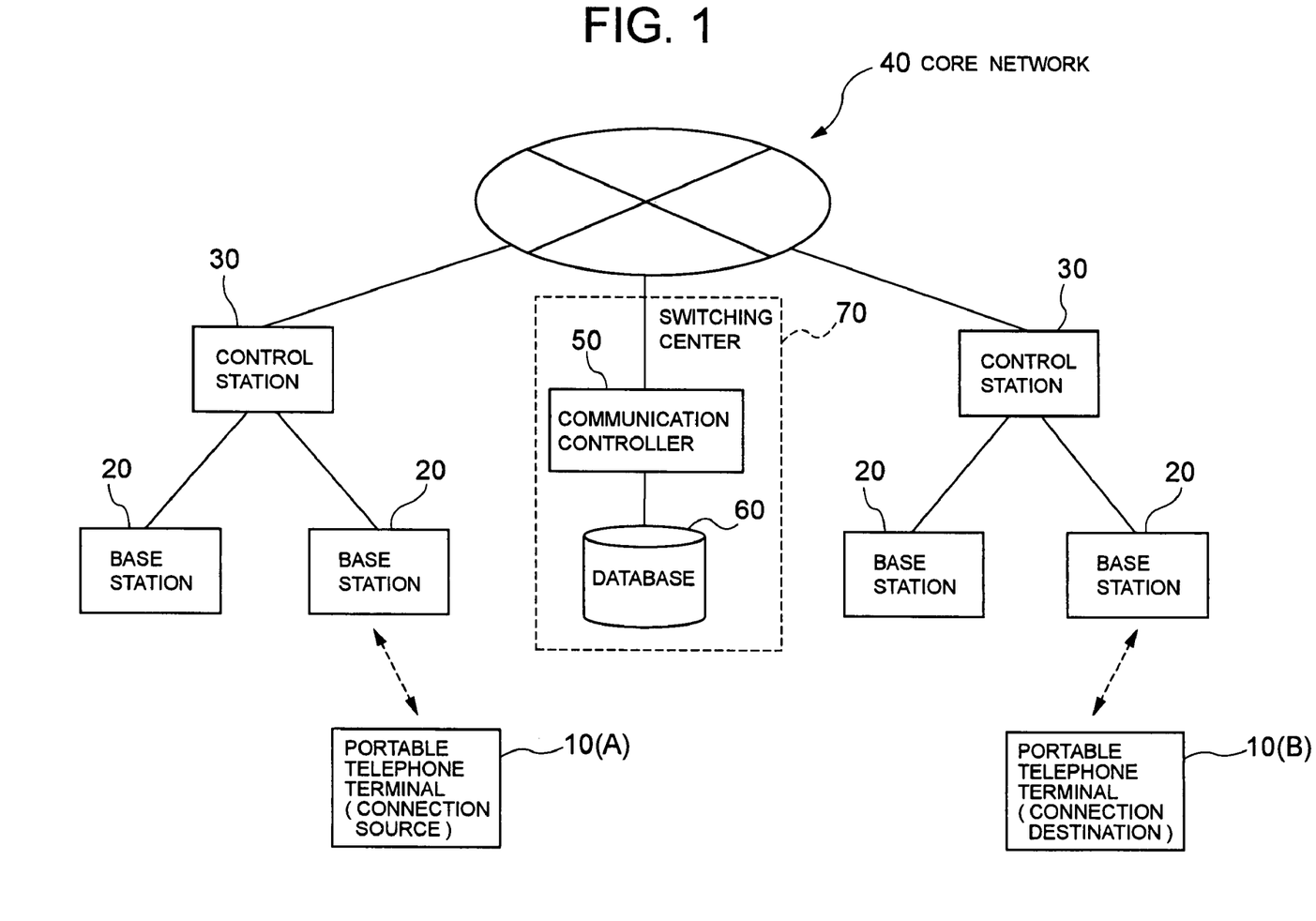
FIG. 1 is a block diagram of a portable telephone communication system according to a first embodiment of the present invention.

FIG. 1 is a block diagram of a portable telephone communication system according to a first embodiment of the invention.

As seen from FIG. 1, the portable telephone communication system comprises a plurality of portable telephone terminals 10, a plurality of base stations 20 making radio communications with the portable telephone terminals 10, a plurality of control stations (RNC) 30 making the radio network control such as hand-over, and a core network 40 connecting them. The core network 40 is provided with a switching center 70 comprising a communication controller 50 and a database 60.

The portable telephone communication system is associated with a plurality of communication modes. In this embodiment, a voice service mode using a voice channel and a television telephone mode using the voice channel and a video channel are exemplified, although the kind or number of associated communication modes is not limited thereto. Also, the associated state of communication mode in each portable telephone terminal 10 depends on the device type, and in this embodiment, the portable telephone terminal 10 associated with the voice service mode alone and the portable telephone terminal 10 associated with the voice service mode and the television telephone mode are mixed.

A basic operation of the portable telephone communication system will be described below.

Each base station 20 periodically transmits a radio wave signal containing inherent area information to indefinite number of portable telephone terminals 10. The portable telephone terminal 10 selects the base station 20 based on a received strength of radio wave and automatically transmits a position registration signal to the base station 20. This transmission process is performed when the power of the terminal 10 is turned on, or the terminal 10 moves across the area. Also, the position registration signal involves at least the terminal identification information (e.g., code of 15 digits) for the portable telephone terminal 10, and the area information of the base station 20. The base station 20 receives the position registration signal from the portable telephone terminal 10 and then transmits it to the switching center 70.

In the database 60 of the switching center 70, the terminal identification information and telephone number of each portable telephone terminal 10 are registered beforehand. The switching center 70 receives the position registration information from the base station 20, and then registers an area number associated with the terminal identification information. That is, the switching center 70 always grasps the latest position (base station 20 capable of radio communication) for the portable telephone terminal 10 in which the power is on.

If at the portable telephone terminal 10, the telephone number of connection destination is inputted, and originated, a connection request signal is transmitted via the base station 20 to the switching center 70. The switching center 70 receives the connection request signal and then specifies the base station 20 with which the portable telephone terminal 10 of connection destination is communicable, based on the position registration information in the database 60, to establish a communication channel between the portable telephone terminal 10 of connection source and the portable telephone terminal 10 of connection destination. Thereby, the portable telephone terminal 10 of connection source and the portable telephone terminal 10 of connection destination are connected to enable the service.

The configurations of the portable telephone terminal 10 and the communication controller 50 (switching center 70) will be described below with reference to the drawings.

Figure 2:
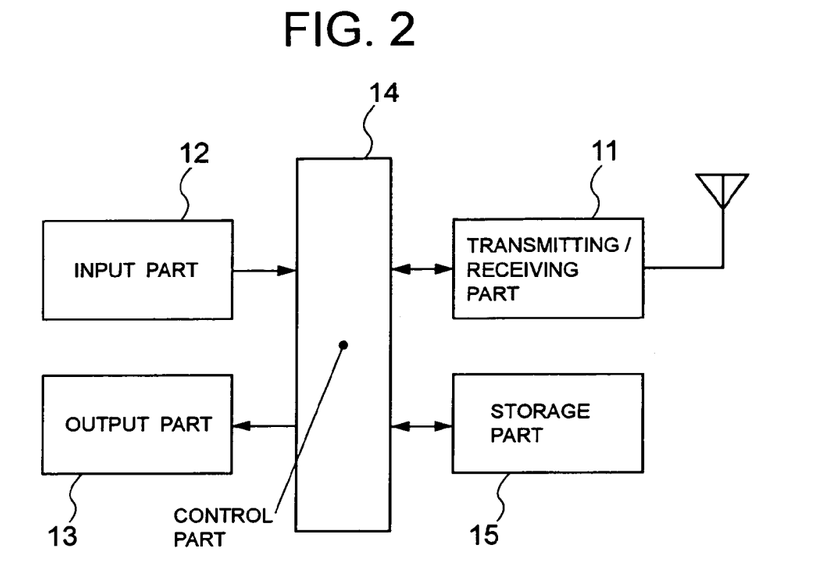
FIG. 2 is a block diagram of a portable telephone terminal according to the first embodiment of the invention.

FIG. 2 is a block diagram of the portable telephone terminal according to the first embodiment of the invention.

As shown in FIG. 2, the portable telephone terminal 10 comprises a transmitting/receiving part 11 for transmitting or receiving the radio wave signal to or from the base station 20, an input part 12 containing a keypad, a microphone and a camera, an output part 13 containing a speaker, a liquid crystal panel and a vibrator, a control part 14 having a CPU, and a storage part 15 having a ROM and a RAM.

The storage part 15 stores the programs and data, in which the stored data contains at least the terminal identification information and the communication mode associated information. The communication mode associated information specifies the communication mode associated state of the portable telephone terminal 10, in which the data format is not limited. In this embodiment, it is required to distinguish between the portable telephone terminal 10 associated with the voice service mode alone and the portable telephone terminal 10 associated with the voice service mode and the television telephone mode.

The control part 14 controls each part in accordance with the program stored in the storage part 15, to provide the portable telephone terminal 10 with various functions. The functions of the portable telephone terminal 10 include a position registration function of transmitting the position registration information to the base station 20, a communication mode registration function of transmitting the communication mode associated information to the base station 20, a voice service function of providing the service employing the voice channel, a television telephone function of providing the service employing the voice channel and the video channel, and a communication mode selection function of selecting the communication mode.

The communication mode registration function involves registering the communication mode associated information in the database 60 for the switching center 70. In this embodiment, in transmitting the position registration information, the communication mode associated information is added. Thereby, the communication mode associated information of the portable telephone terminal 10 is automatically registered in the database 60 without the user making intentional registration operation.

A method of registering the communication mode associated information in the database 60 is not limited to the above. For example, when a portable telephone company registers the terminal identification information or telephone number in the database 60, the communication mode associated information may be additionally registered.

Figure 3:
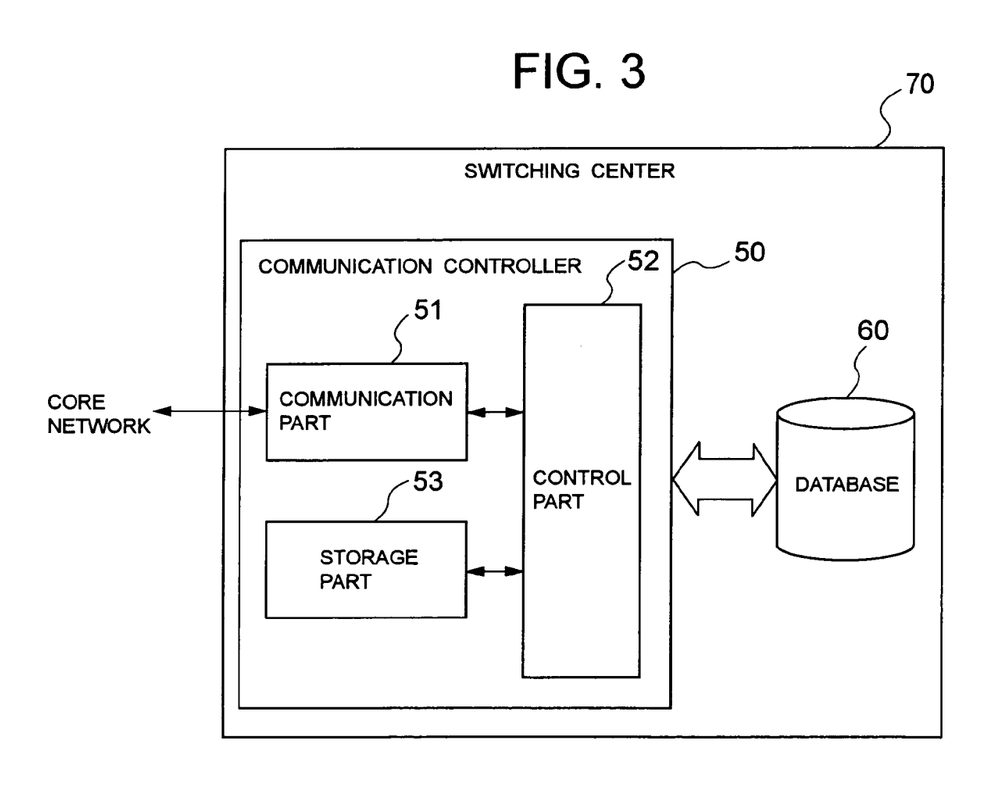
FIG. 3 is a block diagram of a switching center (communication controller and database) according to the first embodiment of the invention.

FIG. 3 is a block diagram of the switching center (communication controller and database) according to the first embodiment of the invention.

As shown in FIG. 3, the communication controller 50 comprises a communication part 51 for making communication with each base station 20, a control part 52 containing a CPU, and a storage part 53 containing a ROM and a RAM, and is connected to the database 60.

The control part 52 controls each part in accordance with the program stored in the storage part 53, to enable the communication controller 50 to make various functions. The functions of the communication controller 50 include an information registration function of registering the position registration information or communication mode associated information received from the base station 20 in the database 60, a voice service connection function of connecting the portable telephone terminals 10 employing the voice channel, a television telephone connection function of connecting the portable telephone terminals 10 employing the voice channel and the video channel, a communication mode notification function of notifying the available communication mode to the portable telephone terminal 10 of connection source, and a communication mode switching function of switching the communication mode.

More specifically, the communication mode notification function involves recognizing the communication mode associated state of each portable telephone terminal 10A, 10B by referring to the database 60, upon receiving a connection request from the portable telephone terminal 10A of connection source to the portable telephone terminal 10B of connection destination, and when multiple communication modes are common to both terminals, notifying the communication modes common to both terminals to the portable telephone terminal 10A of connection source, before connecting to the portable telephone terminal 10B of connection destination.

Also, the communication mode switching function involves switching the communication mode according to a response from the portable telephone terminal 10A after notifying the communication mode.

The operation of the portable telephone terminal 10 and the communication controller 50 will be described below with reference to a flowchart.

The communication mode associated information of each portable telephone terminal 10 is registered in advance in the database 60 by the above registration method.

Figure 4:
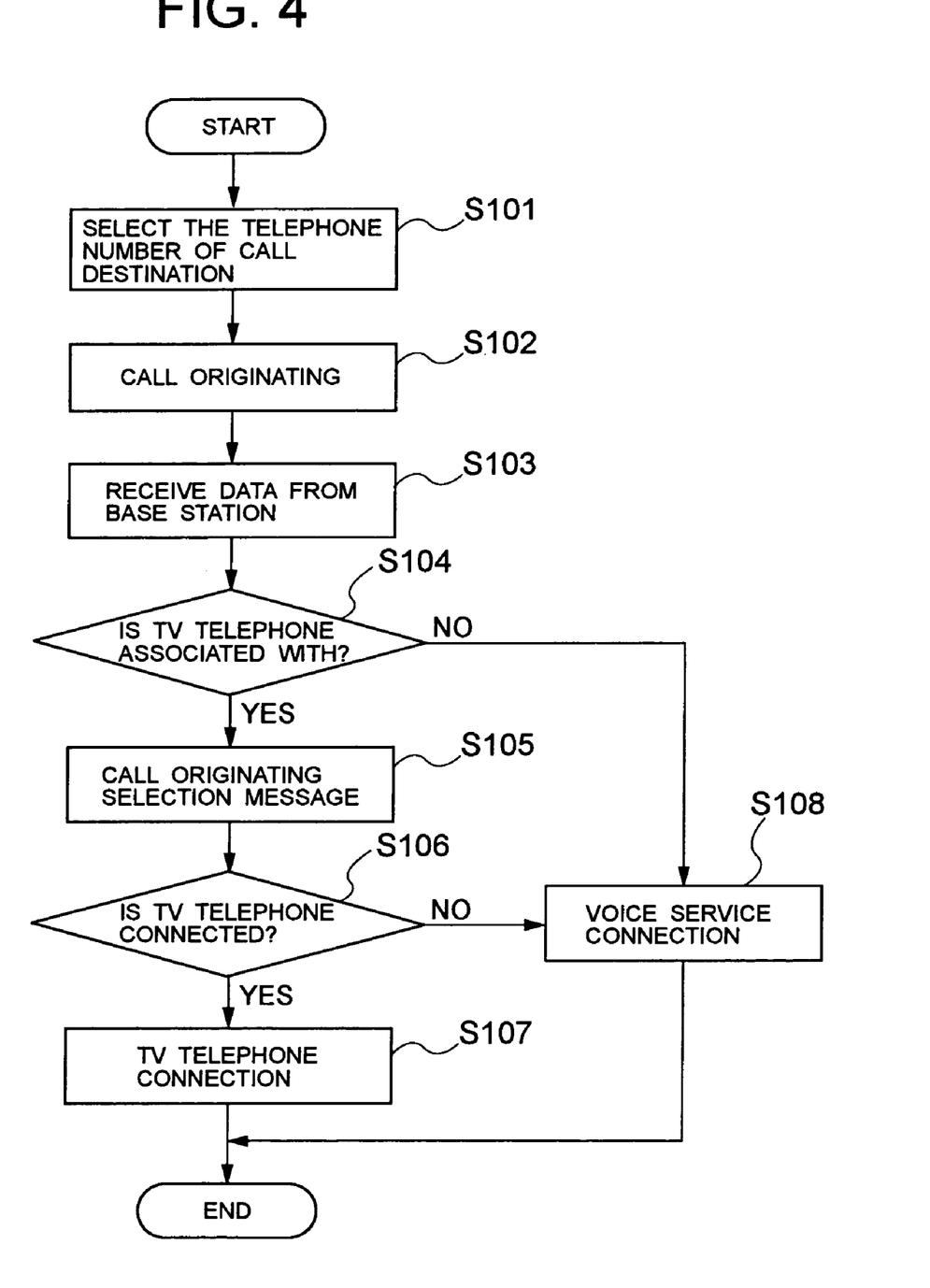
FIG. 4 is a flowchart showing an operation procedure of a portable telephone terminal according to the first embodiment of the invention.

FIG. 4 is a flowchart showing an operation procedure of the portable telephone terminal according to the first embodiment of the invention.

As shown in FIG. 4, the user of the portable telephone terminal 10A having the television telephone function inputs the telephone number of the portable telephone terminal 10B of connection destination and performs a call originating operation (S101, S102). Then, the portable telephone terminal 10A establishes synchronization with the base station 20 to receive the communication mode associated information of the portable telephone terminal 10B registered in the database 60 (S103). The portable telephone terminal 10A checks whether or not the portable telephone terminal 10B of connection destination is associated with the television telephone, based on this information (S104). If the portable telephone terminal 10B of connection destination is associated with the television telephone, a voice message indicating that the connection destination is associated with the television telephone is outputted from the speaker (S105), and then a selection operation of the user is awaited (S106). When the user selects the television telephone mode by key operation, a connection request signal in the television telephone mode is transmitted to start the service in the television telephone mode (S107). Also, when the user selects the voice service mode, or the other party is not associated with the television telephone mode, a connection request signal in the voice service mode is transmitted to start the service in the voice service mode (S108).

Figure 5:
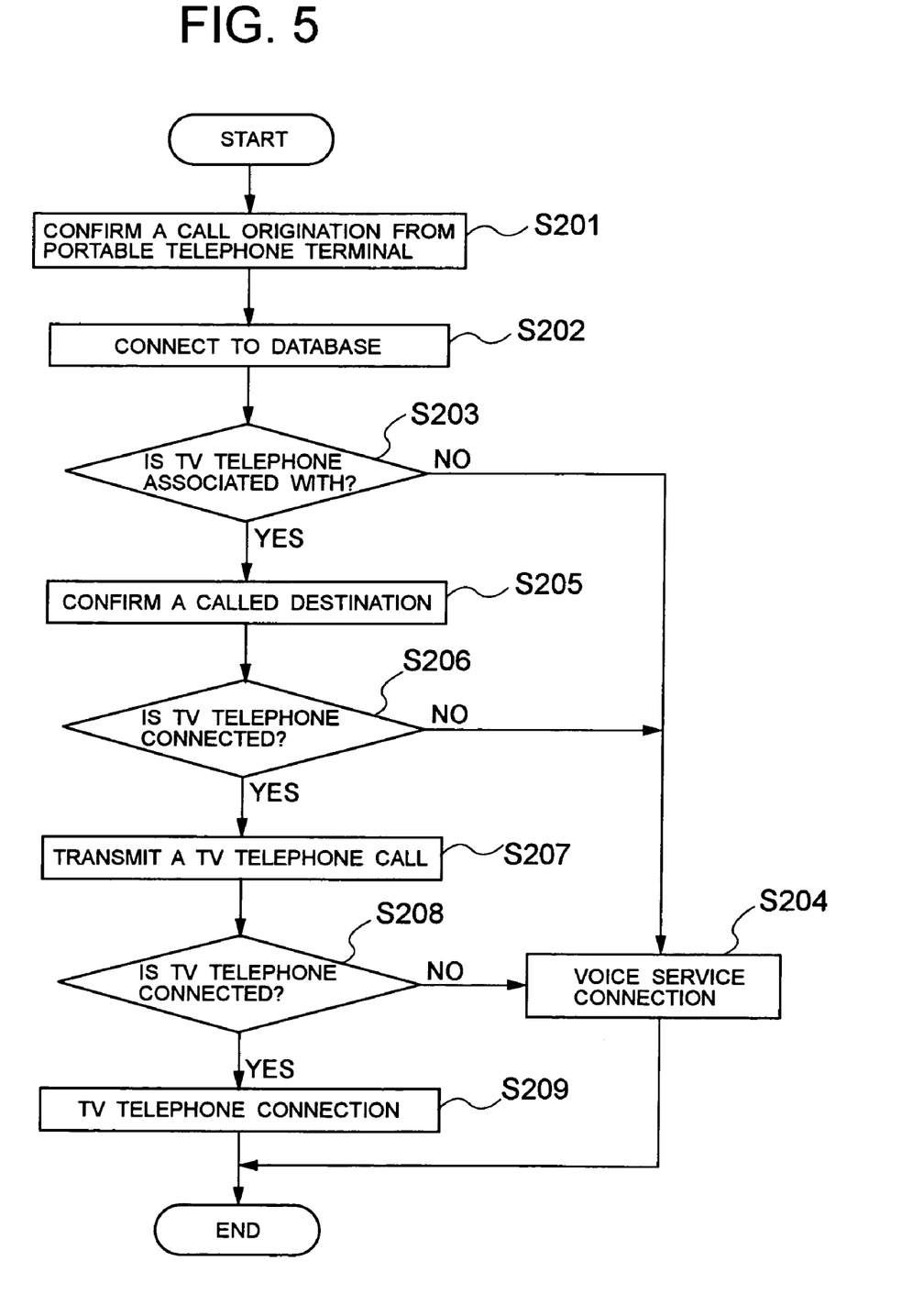
FIG. 5 is a flowchart showing an operation procedure of a communication controller according to the first embodiment of the invention.

FIG. 5 is a flowchart showing an operation procedure of the communication controller according to the first embodiment of the invention.

As shown in FIG. 5, the communication controller 50 confirms a call from the portable telephone terminal 10A of connection source (S201), connects to the database 60 (S202), and then checks whether or not the portable telephone terminal 10A of connection source is associated with the television telephone by referring to the communication mode associated information of the portable telephone terminal 10A of connection source (S203). If it is determined that the portable telephone terminal 10A of connection source is not associated with the television telephone mode, the connection is kept in the voice service mode (S204). Conversely, if it is determined that the portable telephone terminal 10A of connection source is associated with the television telephone mode, the communication mode associated information of the portable telephone terminal 10B of connection destination is acquired from the database 60, based on the telephone number of connection destination (S205), and it is checked whether or not the connection destination is associated with the television telephone mode (S206).

If the connection destination is not associated with the television telephone mode, the connection is kept in the voice service mode (S204). When the connection destination is associated with the television telephone mode, the portable telephone terminal 10A of connection source is notified that the connection destination is the television telephone associated terminal (S207), and a response from the portable telephone terminal 10A is awaited (S208). Herein, when the response from the portable telephone terminal 10A of connection source is the connection request in the voice service mode, the voice service connection is made (S204), or when it is the connection request in the television telephone mode, the portable telephone terminal 10B of connection destination is connected by switching to the television telephone mode (S209).

With the portable telephone communication system according to the first embodiment of the invention as configured above, upon receiving a connection request from the portable telephone terminal 10A of connection source to the portable telephone terminal 10B of connection destination, the communication controller 50 recognizes the communication mode associated states of the portable telephone terminal 10A of connection source and the portable telephone terminal 10B of connection destination by referring to the database 60, and if multiple communication modes are common to both terminals, notifying the multiple communication modes common to both terminals to the portable telephone terminal 10A of connection source, before connecting to the portable telephone terminal 10B of connection destination, whereby it is possible to connect the portable telephone terminals 10 in a desired communication mode without causing wasteful traffic.

Also, it is unnecessary that the user of the portable telephone terminal 10A of connection source recognizes or registers in advance the communication mode associated state of the portable telephone terminal 10B of connection destination, whereby the user is saved from trouble.

Also, upon receiving a notification of the communication modes from the communication controller 50, the portable telephone terminal 10A of connection source prompts the user to select a communication mode, and notifies the communication mode selected by the user to the communication controller 50. Thereby, the user of the portable telephone terminal 10A of connection source confirms the selectable communication modes on the terminal, and performs a predetermined selection operation to be able to connect to the portable telephone terminal 10B of connection destination in a desired communication mode.

Also, since the portable telephone terminal 10 automatically notifies the terminal identification information and the communication mode associated state to the core network 40, it is possible to accumulate the communication mode associated state of each portable telephone terminal 10 in the database 60, and easily handle a change in the communication mode associated state when the device type of the portable telephone terminal 10 is changed, without the user performing the registration operation.

Moreover in this embodiment, the communication mode associated information is registered in the database 60, employing the position registration function that is the basic function of the portable telephone terminal 10, whereby it is possible to easily implement the automatic notification of the communication mode associated state.

This invention is not limited to the above embodiment. For example, a selection message of the communication mode at S105 in FIG. 4 may be a voice message, or an indication message on the liquid crystal panel, or both.

Also, when there is no communication mode associated information of connection destination (portable telephone terminal of the other carrier or fixed telephone terminal) at S206 in FIG. 5, it is preferable to transfer to the voice service connection (S204) because the television telephone mode is not supported.

Also, this invention is not limited to the portable telephone communication system connecting the portable telephone terminals, but may be applied to various communication systems connecting the fixed telephone terminal, IP telephone terminal, or internet terminal.

Figure 6:
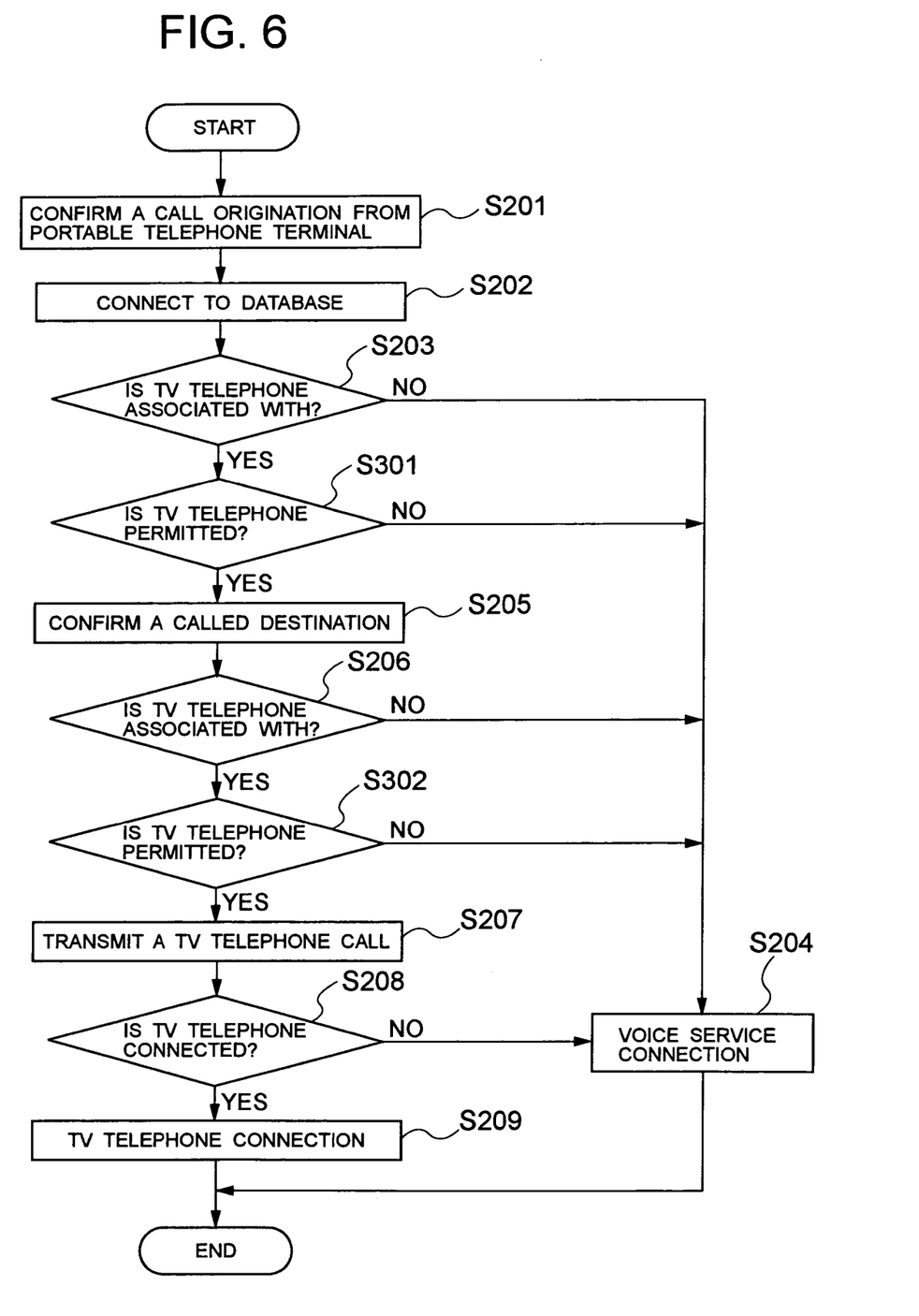
FIG. 6 is a flowchart showing an operation procedure of a communication controller according to a second embodiment of the invention.

Referring to FIG. 6, a second embodiment of the invention will be described below.

For a configuration of the second embodiment common to that of the first embodiment, an explanation of the first embodiment is quoted.

FIG. 6 is a flowchart showing an operation procedure of the communication controller according to the second embodiment of the invention.

As shown in FIG. 6, if the portable telephone terminal 10 registers in advance whether or not the connection is enabled in a predetermined communication mode for each call origination or termination in the database 60, the communication controller 50 of the second embodiment recognizes a communication mode not permitted by the portable telephone terminal 10A of connection source or the portable telephone terminal 10B of connection destination by referring to the database 60 when there is a connection request, and restricts the connection in that communication mode.

Referring to FIG. 6, more specifically, the steps S201 to S203 are the same as in the first embodiment. However, after it is determined that the television telephone is dealt with at step S203, the connection enable information (originating side setting) of the database 60 is referred to (S301), in which if the television telephone connection is not desired, the connection is enabled in the voice service mode (S204), or if the television telephone connection is desired, the procedure transfers to step S205. At S206, if it is determined that the connection destination is associated with the television telephone mode, the connection enable information (called side setting) of the database 60 is referred to (S302), in which if the television telephone connection is not desired, the connection is enabled in the voice service mode (S204), or if the television telephone connection is desired, the procedure proceeds to step S207.

In the second embodiment of the invention as configured above, it is possible to restrict the connection in predetermined communication mode at the former stage of connecting to the portable telephone terminal 10B of connection destination, whereby there is less wasteful traffic than when mode restriction is made at the terminal settings.

Also, since the restricted communication mode can be registered for each call origination or termination, the degree of freedom of settings in terms of the mode restriction is increased.

Figure 7:
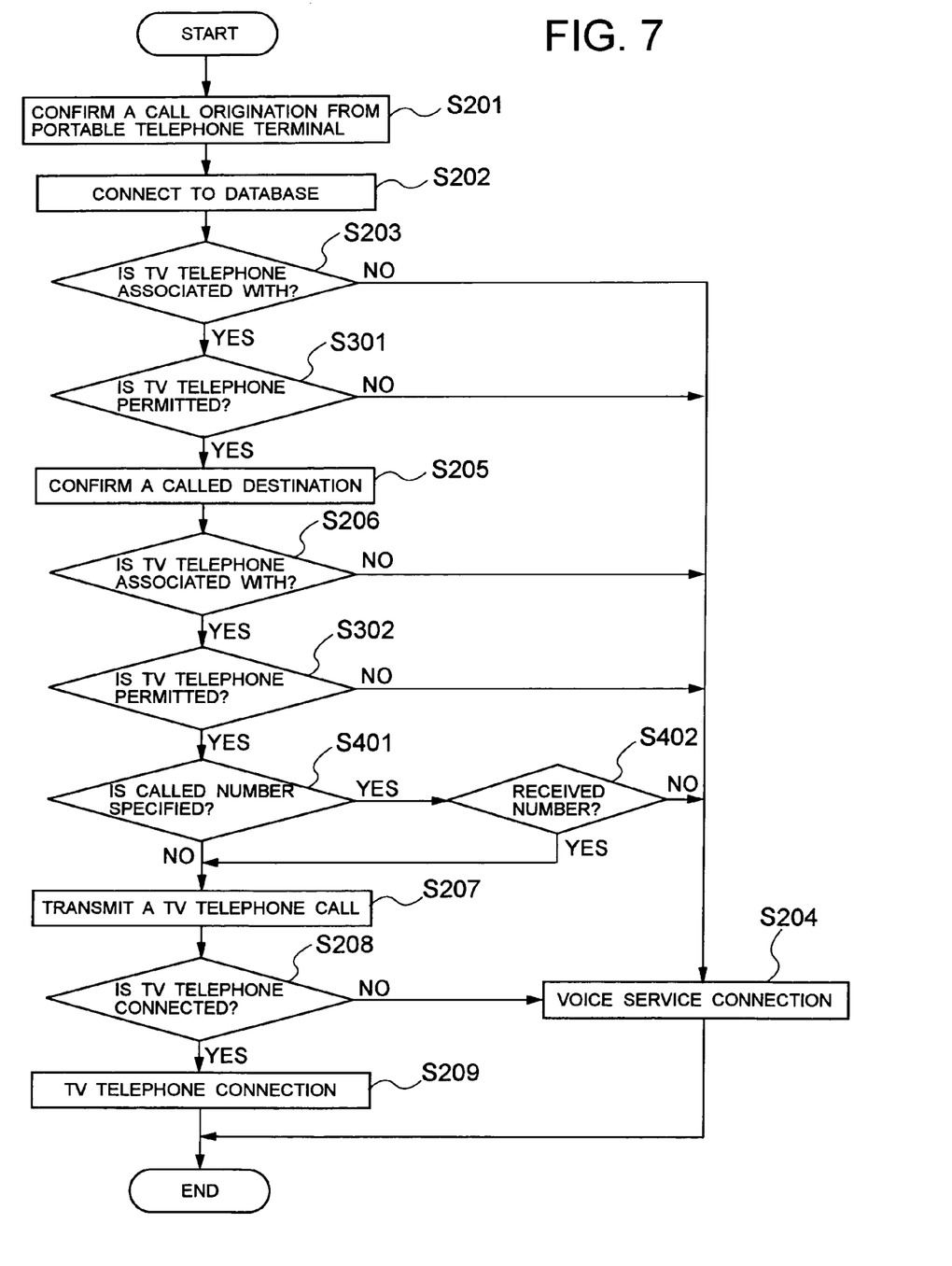
FIG. 7 is a flowchart showing an operation procedure of a communication controller according to a third embodiment of the invention.

Referring to FIG. 7, a third embodiment of the invention will be described below.

For a configuration of the third embodiment common to that of the first or second embodiment, an explanation of the first or second embodiment is quoted.

FIG. 7 is a flowchart showing an operation procedure of the communication controller according to the third embodiment of the invention.

As shown in FIG. 7, if the portable telephone terminal 10 registers in advance the connection permissible terminal in a predetermined communication mode in the database 60, the communication controller 50 of the third embodiment recognizes whether or not the portable telephone terminal 10A of connection source is the connection permissible terminal for the portable telephone terminal 10B of connection destination by referring to the database 60 when there is a connection request, and permits the connection in that communication mode only when the portable telephone terminal 10A of connection source is the connection permissible terminal.

Referring to FIG. 7, more specifically, the steps up to S302 are the same as in FIG. 6. However, at step S302, if the television telephone connection is desired, the called number designation of television telephone is confirmed by referring to the database 60 (S401). Herein, if there is no called number designation, the procedure directly proceeds to S207. On the other hand, if there is any called number designation, the called number is collated with the telephone number registered in the database 60 (S402). If they are matched, the procedure goes to S207, or otherwise, the voice service connection is enabled (S204).

In the third embodiment of the invention as configured above, when the portable telephone terminal 10A other than the connection permissible terminal requests connection in a predetermined communication mode, it is possible to restrict the connection at the former stage of connecting to the portable telephone terminal 10B of connection destination, whereby there is less wasteful traffic than when connection restriction is made at the terminal settings.

This invention is applicable to the communication system, communication controller and communication control method associated with a plurality of communication modes. In particular, the invention is suitable for the portable telephone communication system associated with the voice service mode and the television telephone mode, but not limited to the portable telephone communication system connecting the portable telephone terminal, and may be also applicable to various other communication systems connecting the fixed telephone terminal, the IP telephone terminal and the internet terminal.

As described above, with this invention, even if the user of connection source terminal does not recognize or register in advance the communication mode associated state of connection destination terminal, it is possible to connect the terminals in a desired communication mode.

And the occurrence of wasteful traffic is prevented by notifying the connection source terminal of multiple communication modes common to both terminals, before connecting to the connection destination terminal.

What is claimed is:

1. A communication system associated with a plurality of communication modes, comprising:
a plurality of terminals associated with one or more communication modes; a database storing a communication mode associated state of each terminal; and a communication controller for recognizing the communication mode associated states of a connection source terminal and a connection destination terminal by referring to said database, and if multiple communication modes are common to both terminals, notifying said connection source terminal of said multiple communication modes common to both terminals, before connecting to said connection destination terminal, upon receiving a connection request from said connection source terminal to said connection destination terminal;
wherein said communication modes include at least a voice service mode and a television telephone mode.

2. The communication system according to claim 1, wherein said connection source terminal prompts the user to select a communication mode, and notifies said communication mode selected by the user to said communication controller, upon receiving a notification of communication modes from said communication controller.

3. The communication system according to claim 1, wherein said connection source terminal and/or said connection destination terminal registers in advance whether or not connection is enabled in a predetermined communication mode in said database, and said communication controller recognizes a communication mode not permitted by said connection source terminal and/or said connection destination terminal by referring to said database, and restricts the connection in said communication mode, upon receiving a connection request from said connection source terminal to said connection destination terminal.

4. The communication system according to claim 1, wherein said connection destination terminal registers a connection permissible terminal in a predetermined communication mode in said database, and said communication controller recognizes whether or not said connection source terminal is the connection permissible terminal for said connection destination terminal by referring to said database, and permits the connection in said communication mode, only if said connection source terminal is the connection permissible terminal, upon receiving a connection request from said connection source terminal to said connection destination terminal.

5. The communication system according to claim 1, wherein said terminal is a portable telephone terminal, and said database and said communication controller are provided in a core network of a portable telephone communication network.

6. The communication system according to claim 5, wherein said terminal automatically notifies the terminal identification information and/or portable telephone number and the communication mode associated state to said core network.

7. A communication controller for controlling the communication between a plurality of terminals associated with one or more communication modes,
wherein said communication controller is connected to a database storing a communication mode associated state of each terminal; and
said communication controller recognizes the communication mode associated states of a connection source terminal and a connection destination terminal by referring to said database, and if multiple communication modes are common to both terminals, notifies said connection source terminal of said multiple communication modes common to both terminals, before connecting to said connection destination terminal, upon receiving a connection request from said connection source terminal to said connection destination terminal;
wherein said communication modes include at least a voice service mode and a television telephone mode.

8. A communication control method for controlling the communication between a plurality of terminals associated with one or more communication modes,
wherein a database stores a communication mode associated state of each terminal; and a communication controller recognizes the communication mode associated states of a connection source terminal and a connection destination terminal by referring to said database, and if multiple communication modes are common to both terminals, notifies said connection source terminal of said multiple communication modes common to both terminals, before connecting to said connection destination terminal, upon receiving a connection request from said connection source terminal to said connection destination terminal;
wherein said communication modes include at least a voice service mode and a television telephone mode.

9. The communication system according to claim 1, wherein the voice service mode uses a voice channel.

10. The communication system according to claim 1, wherein the television telephone mode uses a voice channel and a video channel.

11. The communication system according to claim 1, wherein if no multiple communication modes are common to both terminals, said communication controller keeps the communication in a voice service mode.

* * * * *